United States Patent
Shaheen

(10) Patent No.: US 9,843,910 B2
(45) Date of Patent: *Dec. 12, 2017

(54) METHOD AND SYSTEM FOR REPORTING A SHORT MESSAGE CAPABILITY VIA AN IP MULTIMEDIA SUBSYSTEM

(71) Applicant: InterDigital Technology Corporation, Wilmington, DE (US)

(72) Inventor: Kamel M. Shaheen, Cairo (EG)

(73) Assignee: InterDigital Technology Corporation, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/174,289

(22) Filed: Jun. 6, 2016

(65) Prior Publication Data

US 2016/0286368 A1    Sep. 29, 2016

Related U.S. Application Data

(63) Continuation of application No. 14/584,229, filed on Dec. 29, 2014, now Pat. No. 9,363,652, which is a
(Continued)

(51) Int. Cl.
*H04W 4/00* (2009.01)
*H04W 4/14* (2009.01)
(Continued)

(52) U.S. Cl.
CPC ............. *H04W 4/14* (2013.01); *H04L 51/38* (2013.01); *H04L 65/1006* (2013.01);
(Continued)

(58) Field of Classification Search
CPC ...... H04W 4/14; H04W 84/12; H04L 12/5895
(Continued)

(56) References Cited

U.S. PATENT DOCUMENTS 5,519,834 A   5/1996  Kamerman et al.
6,301,242 B1  10/2001 Lindsay et al.
(Continued)

FOREIGN PATENT DOCUMENTS

CN    1585372      2/2005
EP    1 056 269    11/2000
(Continued)

OTHER PUBLICATIONS

De Vriendt et al., "Mobile Network Evolution: A Revolution on the Move," IEEE Communications Magazine, vol. 40, No. 4, pp. 104-111, (Apr. 2002).
(Continued)

*Primary Examiner* — Nghi H Ly
(74) *Attorney, Agent, or Firm* — Volpe and Koenig, P.C.

(57) ABSTRACT

A method and system for reporting short message (SM) capability over an IP multimedia subsystem (IMS) using a session initiation protocol (SIP) are disclosed. A short message Internet Protocol gateway (SM-IP-GW) receives a registration request via session initiation protocol (SIP). The registration request may indicate a capability of a WTRU to receive Short Message Service (SMS) messages via an Internet Protocol multimedia subsystem (IMS). The SM-IP-GW transmits a successful registration message to a home location register (HLR) to indicate that a WTRU has successfully registered with the SM-IP-GW. Once the HLR is informed that a WTRU is successfully registered with the SM-IP-GW, SMS messages may be received and transmitted via the IMS using SIP.

13 Claims, 3 Drawing Sheets

Related U.S. Application Data continuation of application No. 13/338,512, filed on Dec. 28, 2011, now Pat. No. 8,923,901, which is a continuation of application No. 11/444,844, filed on May 31, 2006, now Pat. No. 8,090,392.

(60) Provisional application No. 60/705,911, filed on Aug. 5, 2005.

(51) Int. Cl.
*H04L 12/58* (2006.01)
*H04L 29/06* (2006.01)
*H04W 8/04* (2009.01)
*H04W 60/04* (2009.01)
*H04W 84/12* (2009.01)
*H04W 88/16* (2009.01)

(52) U.S. Cl.
CPC .......... *H04L 65/1016* (2013.01); *H04W 8/04* (2013.01); *H04W 60/04* (2013.01); *H04W 84/12* (2013.01); *H04W 88/16* (2013.01)

(58) Field of Classification Search
USPC .......................... 455/435.1, 466, 424, 412.1
See application file for complete search history.

(56) References Cited

U.S. PATENT DOCUMENTS

| | | | |
|---|---|---|---|
| 6,658,011 B1 | 12/2003 | Sevanto et al. | |
| 6,678,361 B2 | 1/2004 | Rooke et al. | |
| 6,725,031 B2 | 4/2004 | Watler et al. | |
| 6,871,070 B2 | 3/2005 | Ejzak | |
| 6,885,871 B2 | 4/2005 | Caloud | |
| 6,940,844 B2 | 9/2005 | Purkayastha et al. | |
| 6,977,921 B1 | 12/2005 | Dolan | |
| 7,079,524 B2 | 7/2006 | Bantukul et al. | |
| 7,181,231 B2 | 2/2007 | Le Bodic et al. | |
| 7,310,514 B2 | 12/2007 | Shinohara | |
| 7,502,339 B1 | 3/2009 | Pirkola et al. | |
| 7,715,856 B2 * | 5/2010 | Shaheen | H04L 12/5895 455/453 |
| 7,899,477 B2 | 3/2011 | Shaheen | |
| 8,023,941 B2 | 9/2011 | Shaheen et al. | |
| 8,090,392 B2 * | 1/2012 | Shaheen | H04L 12/5895 455/412.1 |
| 8,175,626 B2 | 5/2012 | Shaheen | |
| 8,526,981 B2 * | 9/2013 | Shaheen | H04L 12/5895 455/453 |
| 8,731,097 B2 | 5/2014 | Laumen et al. | |
| 9,363,652 B2 * | 6/2016 | Shaheen | H04L 12/5895 |
| 2002/0077132 A1 | 6/2002 | Mizell et al. | |
| 2002/0085516 A1 | 7/2002 | Bridgelall | |
| 2002/0136173 A1 | 9/2002 | Monroe et al. | |
| 2002/0191575 A1 | 12/2002 | Kalavade et al. | |
| 2003/0016639 A1 | 1/2003 | Kransmo et al. | |
| 2003/0026245 A1 | 2/2003 | Ejzak | |
| 2003/0172121 A1 | 9/2003 | Evans et al. | |
| 2003/0233457 A1 | 12/2003 | Basilier et al. | |
| 2004/0006641 A1 | 1/2004 | Abrol et al. | |
| 2004/0066756 A1 | 4/2004 | Ahmavaara et al. | |
| 2004/0067761 A1 | 4/2004 | Pyhalammi et al. | |
| 2004/0071127 A1 | 4/2004 | Hurtta | |
| 2004/0106430 A1 | 6/2004 | Schwarz et al. | |
| 2004/0151192 A1 | 8/2004 | Trossen | |
| 2004/0185837 A1 | 9/2004 | Kim et al. | |
| 2004/0199649 A1 | 10/2004 | Tarnanen et al. | |
| 2004/0203737 A1 | 10/2004 | Myhre et al. | |
| 2004/0203763 A1 | 10/2004 | Tammi | |
| 2004/0224666 A1 | 11/2004 | Jain et al. | |
| 2004/0249891 A1 | 12/2004 | Khartabil et al. | |
| 2004/0259531 A1 | 12/2004 | Wood et al. | |
| 2005/0002407 A1 | 1/2005 | Shaheen | |
| 2005/0007984 A1 | 1/2005 | Shaheen et al. | |
| 2005/0020286 A1 | 1/2005 | Lazaridis et al. | |
| 2005/0117602 A1 | 6/2005 | Carrigan et al. | |
| 2005/0198304 A1 | 9/2005 | Oliver et al. | |
| 2005/0203698 A1 | 9/2005 | Lee | |
| 2005/0233758 A1 | 10/2005 | Salmi | |
| 2005/0282567 A1 | 12/2005 | Ala-Luukko | |
| 2006/0135182 A1 | 6/2006 | Unmehopa | |
| 2006/0136554 A1 | 6/2006 | Rajaniemi et al. | |

FOREIGN PATENT DOCUMENTS

| | | |
|---|---|---|
| EP | 1 257 141 | 11/2002 |
| EP | 1 357 764 | 10/2003 |
| EP | 1 515 514 | 3/2005 |
| JP | 2003-263392 | 9/2003 |
| JP | 2004-153383 | 5/2004 |
| RU | 2000-113222 | 4/2002 |
| RU | 2004-138808 | 8/2005 |
| WO | 00/33498 A2 | 6/2000 |
| WO | 00/079813 | 12/2000 |
| WO | 02/93957 | 3/2002 |
| WO | 03/003653 | 1/2003 |
| WO | 03/079637 | 9/2003 |
| WO | 03/096603 | 11/2003 |
| WO | 03/103198 | 12/2003 |
| WO | 03/107621 | 12/2003 |
| WO | 2004/004407 | 1/2004 |
| WO | 2004/008178 | 1/2004 |
| WO | 2004/012471 | 2/2004 |
| WO | 2004/034718 | 4/2004 |
| WO | 2006/001683 | 1/2006 |

OTHER PUBLICATIONS

Digital cellular telecommunications system (Phase 2); Mobile-services Switching Centre—Base Station System (MSC—BSS) interface; Layer 3 specification (GSM 08.08 version 4.12.1), ETS 300 590 (Oct. 1998).

Digital cellular telecommunications system (Phase 2+); Mobile radio interface layer 3 specification, Radio Resource Control Protocol (GSM 04.18 version 9.0.0 Release 2000), GSM 04.18 V9.0.0 (Jul. 2000).

Digital cellular telecommunications system (Phase 2+); Mobile-services Switching Centre—Base Station System (MSC—BSS) interface; Layer 3 specification (GSM 08.08 version 5.12.0 Release 1996), GSM 08.08 (Jun. 2000).

Digital cellular telecommunications system (Phase 2+); Mobile-services Switching Centre—Base Station System (MSC—BSS) interface; Layer 3 specification (GSM 08.08 version 6.5.0 Release 1997), ETSI TS 100 590 V6.5.0 (Jun. 2000).

Digital cellular telecommunications system (Phase 2+); Mobile-services Switching Centre—Base Station System (MSC—BSS) interface; Layer 3 specification (GSM 08.08 version 9.0.0 Release 2000), GSM 08.08 V9.0.0 (Jul. 2000).

Digital cellular telecommunications system (Phase 2+); Universal Mobile Telecommunications System (UMTS); Mobile radio interface Layer 3 specification; Core network protocols; Stage 3 (3GPP TS 24.008 version 6.9.0 Release 6) ETSI TS 124 008 V6.9.0 (Jun. 2005).

Digital cellular telecommunications system (Phase 2+); Universal Mobile Telecommunications System (UMTS); IP Multimedia Subsystems (IMS); Stage 3 (3GPP TS 230228 version 6.10.0 Release 6) ETSI TS 123 228 V6.10.0 (Jun. 2005).

Digital cellular telecommunications system (Phase 2+); Universal Mobile Telecommunications System (UMTS); IP Multimedia Subsystem (IMS); Stage 2 (3GPP TS 23.228 version 7.3.0 Release 7) ETSI TS 123 228 V7.3.0 (Mar. 2006).

Digital cellular telecommunications system (Phase 2+); Universal Mobile Telecommunications System (UMTS); Mobile radio interface Layer 3 specification; Core network protocols; Stage 3 (3GPP TS 24.008 version 6.13.0 Release 6) (Jun. 2006).

Digital cellular telecommunications system (Phase 2+); Universal Mobile Telecommunications System (UMTS); IP Multimedia Subsystem (IMS); Stage 2 (3GPP TS 23.228 version 6.14.0 Release 6) (Jun. 2006).

(56) References Cited

OTHER PUBLICATIONS

Digital cellular telecommunications system (Phase 2+); Universal Mobile Telecommunications System (UMTS); IP Multimedia Subsystem (IMS); Stage 2 (3GPP TS 23.228 version 7.4.0 Release 7) (Jun. 2006).
European digital cellular telecommunication system (phase 1); BSS-MSC Layer 3 Specification; GSM 08.08 version 3.10.1 (Jan. 1995).
Gratschew et al., "A Multimedia Messaging Platform for Content Delivering," 10$^{th}$ International Conference on Telecommunications, vol. 1, pp. 431-435 (Feb. 23-Mar. 1, 2003).
Griffin et al., "Integrating SIP, Presence and FTP to provide Wireless Multimedia Messaging," IEEE Wireless Communications and Networking Conference, vol. 4 (Mar. 21, 2004).
Haartsen, "Bluetooth—The Universal Radio Interface for AD HOC, Wireless Connectivity," Ericsson Review, Ericsson, Stockholm, SE, No. 3, pp. 110-117, (1998).
Information Technology—Telecommunications and Information Exchange Between Systems—Local and Metropolitan Area Networks—Specific Requirements—Part 11: Wireless LAN Medium Access Control (MAC) and Physical Layer (PHY) Specifications, ANSI/IEEE Std 802.11, 1999 Edtion (R2003).
Peersman et al., "The Global System for Mobile Communications Short Message Service" IEEE Personal Communications Society, vol. 7, No. 3, pp. 15-23 (Jun. 2000).
Rosenberg et al., "Indicating User Agent Capabilities in the Session Initiation Protocol (SIP)," Network Working Group, Request for Comments: 3840 (Aug. 2004).
SA2, "Combined CR to 23.234 Annex D (SMS over IP)," 3GPP TSG-SA2 Meeting #40, S2-042230, Sophia Antipolis, France, (May 17-21, 2004).
Salkintzis et al., "WLAN-GPRS Integration for Next-Generation Mobile Data Networks," IEEE Wireless Communications, vol. 9, No. 5, pp. 112-123 (Oct. 2002).
Siemens, "Translating an Emergency SIP URI into a routable E.164 Number," 3GPP TSG SA WG2 #36, S2-034308, New York, USA, (Nov. 24-28, 2003).
Third Generation Partnership Project, "Technical Specification Group GSM/EDGE Radio Access Network; Mobile-services Switching Centre—Base Station System (MSC-BSS) interface; Layer 3 specification (Release 1999)," 3GPP TS 08.08 V8.15.0 (Sep. 2003).
Third Generation Partnership Project, "Technical Specification Group Services and System Aspects; IP Multimedia System (IMS) messaging; Stage 1 (Release 6)," 3GPP TS 22.340 V6.2.0 (Mar. 2005).
Third Generation Partnership Project, "Technical Specification Group Services and System Aspects; IP Multimedia System (IMS) messaging; Stage 1 (Release 7)," 3GPP TS 22.340 V7.0.0 (Dec. 2005).
Third Generation Partnership Project, "Technical Specification Group Services and SystemAspects; Support of SMS and MMS over generic 3GPP IP access; Stage 2 (Release 7)," 3GPP TS 23.204 V1.1.0 (Feb. 2006).
Third Generation Partnership Project, "Technical Specification Group Core Network and Terminals; Voice Call Continuity between the Circuit-Switched (CS) domain and the IP Multimedia (IP) Core Network (CN) subsystem; Stage 3 (Release 7)," 3GPP TS 24.206 V0.4.0 (Feb. 2006).
Third Generation Partnership Project, "Technical Specification Group Core Network and Terminals; Voice call Continuity between the Circuit-Switched (CS) domain and the (IP) Core Network (CN) subsystem; Stage 1 (Release 7)," 3GPP TS 24.206 V0.6.0 (Jul. 2006)
Third Generation Partnership Project, "Technical Specification Group Core Network and Terminals; Support of SMS and MMS over IP networks; Stage 3 (Release 7)," 3GPP TS 24.341 V0.1.0 (May 2006).
Third Generation Partnership Project, "Technical Specification Group GSM/EDGE Radio Access Network; Mobile radio interface layer 3 specification; Radio Resource Control Protocol (Release 1999)," 3GPP TS 04.18 V8.26.0 (Apr. 2005).
Third Generation Partnership Project, "Technical Specification Group GSM/EDGE Radio Access Network; Mobile radio interface layer 3 specification; Radio Resource Control Protocol (Release 1999)," 3GPP TS 04.18 V8.27.0 (May 2006).
Third Generation Partnership Project, "Technical Specification Group GSM EDGE Radio Access Network; Mobile-services Switching Centre—Base Station System (MSC-BSS) interface; Layer 3 specification (Release 1998)," 3GPP TS 08.08 V7.7.0 (Oct. 2000).
Third Generation Partnership Project, "Technical Specification Group Terminals; Technical realization of the Short Message Service (SMS) (Release 1999)," 3GPP TS 23.040 V3.10.0 (Jun. 2003).
Third Generation Partnership Project, "Technical Specification Group Terminals; Technical realization of the Shot Message Service (SMS) (Release 4)," 3GPP TS 23.040 V4.9.0 (Sep. 2004).
Third Generation Partnership Project, "Technical Specification Group Terminals; Technical realization of the Short Message Service (SMS); (Release 5)," 3GPP TS 23.040 V5.8.1 (Oct. 2004).
Third Generation Partnership Project, "Technical Specification Group Terminals; Technical realization of the Short Message Service (SMS); (Release 6)," 3GPP TS 23.040 V6.5.0 (Sep. 2004).
Third Generation Partnership Project, "Technical Specification Group Core Network and Terminals; Technical realization of the Short Message Service (SMS) (Release 6), " 3GPP TS 23.040 V6.7.0 (Mar. 2006).
Third Generation Partnership Project, "Technical Specification Group Services and System Aspects; IP Multimedia Subsystem (IMS); Stage 2 (Release 5)," 3GPP TS 23.228 V5.13.0 (Dec. 2004).
Third Generation Partnership Project, "Technical Specification Group Services and System Aspects; IP Multimedia Subsystem (IMS); Stage 2 (Release 5)," 3GPP TS 23.228 V5.14.0 (Sep. 2005).
Third Generation Partnership Project, "Technical Specification Group Services and System Aspects; IP Multimedia Subsystem (IMS); Stage 2 (Release 6)," 3GPP TS 23.228 V6.10.0 (Jun. 2005).
Third Generation Partnership Project, "Technical Specification Group Services and System Aspects; IP Multimedia Subsystem (IMS); Stage 2 (Release 6)," 3GPP TS 23.228 V6.13.0 (Mar. 2006).
Third Generation Partnership Project, "Technical Specification Group Services and System Aspects; IP Multimedia Subsystem (IMS); Stage 2 (Release 7)," 3GPP TS 23.228 V7.3.0 (Mar. 2006).
Third Generation Partnership Project, "Technical Specification Group Services and System Aspects; 3GPP system to Wireless Local Area Network (WLAN) interworking; System description (Release 6)," 3GPP TS 23.234 V6.5.0 (Jun. 2005).
Third Generation Partnership Project, "Technical Specification Group Services and System Aspects; 3GPP system to Wireless Local Area Network (WLAN) interworking; System description (Release 6)," 3GPP TS 23.234 V6.8.0 (Mar. 2006).
Third Generation Partnership Project, "Technical Specification Group Services and System Aspects; 3GPP system to Wireless Local Area Network (WLAN) interworking; System description (Release 7)," 3GPP TS 23.234 V7.0.0 (Dec. 2005).
Third Generation Partnership Project, "Technical Specification Group Services and System Aspects; 3GPP system to Wireless Local Area Network (WLAN) interworking; System description (Release 7)," 3GPP TS 23.234 V7.1.0 (Mar. 2006).
Third Generation Partnership Project, "Technical Specification Group Services and System Aspects; Support of SMS and MMS over generic 3GPP IP access (Release 7)," 3GPP TR 23.804 V7.0.0 (Jun. 2005).
Third Generation Partnership Project, "Technical Specification Group Services and System Aspects; Support of SMS and MMS over generic 3GPP IP access (Release 7)," 3GPP TR 23.804 V7.1.0 (Sep. 2005).
Third Generation Partnership Project, "Technical Specification Group Core Network; Point to Point (PP) Short Message Service (SMS) support on mobile radio interface (Release 1999)," 3GPP TS 24.011 V3.6.0 (Mar. 2001).

(56) References Cited

OTHER PUBLICATIONS

Third Generation Partnership Project, "Technical Specification Group Core Network; Point-to-Point (PP) Short Message Service (SMS) support on mobile radio interface (Release 4)," 3GPP TS 24.011 V4.1.1 (Jun. 2002).
Third Generation Partnership Project, "Technical Specification Group Core Network; Point-to-Point (PP) Short Message Service (SMS) support on mobile radio interface (Release 5)," 3GPP TS 24.011 V5.2.0 (Jun. 2003).
Third Generation Partnership Project, "Technical Specification Group Core Network and Terminals; Point-to-Point (PP) Short Message Service (SMS) support on mobile radio interface (Release 6)," 3GPP TS 24.011 V6.1.0 (Jun. 2005).
Third Generation Partnership Project, "Technical Specification Group Radio Access Network; Radio Resource Control (RRC) protocol specification (Release 1999)," 3GPP TS 25.331 V3.21.0 (Dec. 2004).
Third Generation Partnership Project, "Technical Specification Group Radio Access Network; Radio Resource Control (RRC); Protocol Specification (Release 4)," 3GPP TS 25.331 V4.17.0 (Mar. 2005).
Third Generation Partnership Project, "Technical Specification Group Radio Access Network; Radio Resource Control (RRC); Protocol Specification (Release 5)," 3GPP TS 25.331 V5.13.0 (Jun. 2005).
Third Generation Partnership Project, "Technical Specification Group Radio Access Network; Radio Resource Control (RRC); Protocol Specification (Release 5)," 3GPP TS 25.331 V5.16.0 (Mar. 2006).
Third Generation Partnership Project, "Technical Specification Group Radio Access Network; Radio Resource Control (RRC); Protocol Specification (Release 6)," 3GPP TS 25.331 V6.6.0 (Jun. 2005).
Third Generation Partnership Project, "Technical Specification Group Radio Access Network; Radio Resource Control (RRC); Protocol Specification (Release 6)," 3GPP TS 25.331 V6.9.0 (Mar. 2006).
Third Generation Partnership Project, "Technical Specification Group Radio Access Network; Radio Resource Control (RRC); Protocol Specification (Release 7)," 3GPP TS 25.331 V7.0.0 (Mar. 2006).
Third Generation Partnership Project, "Technical Specification Group Core Network; Mobile Application Part (MAP) specification (Release 1999)," 3GPP TS 29.002 V3.20.0 (Jun. 2004).
Third Generation Partnership Project, "Technical Specification Group Core Network; Mobile Application Part (MAP) specification; (Release 4)," 3GPP TS 29.002 V4.15.0 (Jun. 2004).
Third Generation Partnership Project, "Technical Specification Group Core Network; Mobile Application Part (MAP) specification; (Release4)," 3GPP TS 29.002 V4.16.0 (Sep. 2005).
Third Generation Partnership Project, "Technical Specification Group Core Network; Mobile Application Part (MAP) specification; (Release 5)," 3GPP TS 29.002 V5.10.0 (Jun. 2004).
Third Generation Partnership Project, "Technical Specification Group Core Network; Mobile Application Part (MAP) specification; (Release 5)," 3GPP TS 29.002 V5.11.0 (Sep. 2005).
Third Generation Partnership Project, "Technical Specification Group Core Network and Terminals; Mobile Application Part (MAP) specification; (Release 6)," 3GPP TS 29.002 V6.10.0 (Jun. 2005).
Third Generation Partnership Project, "Technical Specification Group Core Network and Terminals; Mobile Application Part (MAP) specification; (Release 6)," 3GPP TS 29.002 V6.13.0 (Mar. 2006).
Third Generation Partnership Project, "Technical Specification Group Core Network and Terminals; Mobile Application Part (MAP) specification; (Release 7)," 3GPP TS 29.002 V7.0.0 (Jun. 2005).
Third Generation Partnership Project, "Technical Specification Group Core Network and Terminals; Mobile Application Part (MAP) specification; (Release 7)," 3GPP TS 29.002 V7.3.0 (Mar. 2006).
Third Generation Partnership Project, "Technical Specification Group Terminals; 3GPP Generic User Profile Common Objects; Stage 3 (Release 6)," 3GPP TS 24.241 V0.5.0 (Nov. 2003).
Third Generation Partnership Project, "Technical Specification Group Services and Systems Aspects; IP Multimedia Subsystem (IMS); Stage 2 (Release 6)," 3GPP TS 23.228 V6.9.0 (Mar. 2003).
Third Generation Partnership Project, "Technical Specification Group Servies and Systems Aspects; IP Multimedia Subsystems (IMS); Stage 2 (Release 6)," 3GPP TS 23.228 V6.5.0 (Mar. 2004).
Third Generation Partnership Project, "Technical Specification Group Servies and Systems Aspects; IP Multimedia Subsystem (IMS); Stage 2 (Release 5)," 3GPP TS 23.228 V5.12.0 (Mar. 2004).
Third Generation Partnership Project, "Technical Specification Group Terminals; Technical realization of the Short Message Service (SMS) (Release 4)," 3GPP TS 23.040 V4.8.0 (Jun. 2003).
Third Generation Partnership Project, "Technical Specification Group Terminals; Technical realization of the Short Message Service (SMS) (Release 5), " 3GPP TS 23.040 V5.7.1 (Apr. 2004).
Third Generation Partnership Project, "Technical Specification Group Terminals; Technical realization of the Short Message Service (SMS) (Release 6)," 3GPP TS 23.040 V6.3.0 (Mar. 2004).
Third Generation Partnership Project, "Technical Specification Group GSM/EDGE Radio Access Network; Mobile radio interface layer 3 specification; Radio Resource Control Protocol (Release 1999)," 3GPP TS 04.18 V8.21.0 (Feb. 2004).
Third Generation Partnership Project, "Technical Specification Group Core Network; Mobile radio interface layer 3 specification (Release 1998)," 3GPP TS 04.08 V7.21.0 (Dec. 2003).
Third Generation Partnership Project, "Technical Specification Group Core Network; Point-to-Point (PP) Short Message Service (SMS) support on mobile radio interface (Release 6)," 3GPP TS 24.011 V6.0.0 (Sep. 2003).
Third Generation Partnership Project, "Technical Specification Group Core Network; Mobile Application Part (MAP) specification; (Release 6), " 3GPP TS 29.002 V6.9.0 (Mar. 2005).
Third Generation Partnership Project, "Technical Specification Group Radio Access Network; Radio Resource Control (RRC); Protocol Specification (Release 6)," 3GPP TS 25.331 V6.1.0 (Mar. 2004).
Third Generation Partnership Project, "Technical Specification Group Core Network; Mobile Application Part (MAP) specification; (Release 6)," 3GPP TS 29.002 V6.5.0 (Mar. 2007).
Third Generation Partnership Project, "Technical Specification Group Radio Access Network; Radio Resource Control (RRC); Protocol Specification (Release 6)," 3GPP TS 25.331 V6.5.0 (Mar. 2005).
Third Generation Partnership Project, "Technical Specification Group Services and System Aspects; 3GPP system to Wireless Local Area Network (WLAN) interworking; System description (Release 6)," 3GPP TS 23.234 V6.0.0 (Mar. 2004).
Third Generation Partnership Project, "Technical Specification Group Services and System Aspects; 3GPP system to Wireless Local Area Network (WLAN) interworking; System description (Release 6)," 3GPP TS 23.234 V6.4.0 (Mar. 2005).
Third Generation Partnership Project, "Technical Specification Group Services and System Aspects; Support of SMS and MMS Over Generic 3GPP IP Access (Release 7)," 3GPP TR 23.804 V1.1.0, (Apr. 2005).
Third Generation Partnership Project, "Technical Specification Group Core Network and Terminals; Support of SMS and MMS Over IP Networks; Stage 3 (Release 7)," 3GPP TS 24.341 V.0.0.3, (May 2006).
Tsao et al., "VSGN: A Gateway Approach to Interconnect UMTS/WLAN Networks," Personal, Indoor and Mobile Radio Communications, vol. 1, pp. 275-279, (Sep. 2002).
Vanwasi, A. K. "Messaging on the Move." Network Magazine India. http://www.networkmagazineindia.com/200109/wireless1.htm Accessed Oct. 11, 2006.

(56) References Cited

OTHER PUBLICATIONS

Interdigital Communication, "Correcting status of Annex D from Informative back to Normative," 3GPP TSG-SA2 Meeting #39, S2-041339, Shenzhen, China (Apr. 19-23, 2004).

Third Generation Partnership Project, "Technical Specification Group Core Network and Terminals; IP Multimedia Call Control Protocol based on Session Initiation Protocol (SIP) and Session Description Protocol (SDP); Stage 3 (Release 5)," 3GPP TS 24.229 V5.13.0 (Jun. 2005).

Third Generation Partnership Project, "Technical Specification Group Core Network and Terminals; IP Multimedia Call Control Protocol based on Session Initiation Protocol (SIP) and Session Description Protocol (SDP); Stage 3 (Release 5)," 3GPP TS 24.229 V5.16.0 (Mar. 2006).

Third Generation Partnership Project, "Technical Specification Group Core Network and Terminals; IP Multimedia Call Control Protocol based on Session Initiation Protocol (SIP) and Session Description Protocol (SDP); Stage 3 (Release 6)," 3GPP TS 24.229 V6.7.0 (Jun. 2005).

Third Generation Partnership Project, "Technical Specification Group Core Network and Terminals; IP Multimedia Call Control Protocol based on Session Initiation Protocol (SIP) and Session Description Protocol (SDP); Stage 3 (Release 6)," 3GPP TS 24.229 V6.10.0 (Mar. 2006).

Third Generation Partnership Project, "Technical Specification Group Core Network and Terminals; IP multimedia call control protocol based on Session Initiation Protocol (SIP) and Session Description Protocol (SDP); Stage 3 (Release 7)," 3GPP TS 24.229 V7.0.0 (Jun. 2005).

Third Generation Partnership Project, "Technical Specification Group Core Network and Terminals; IP multimedia call control protocol based on Session Initiation Protocol (SIP) and Session Description Protocol (SDP); Stage 3 (Release 7)," 3GPP TS 24.229 V7.3.0 (Mar. 2006).

\* cited by examiner

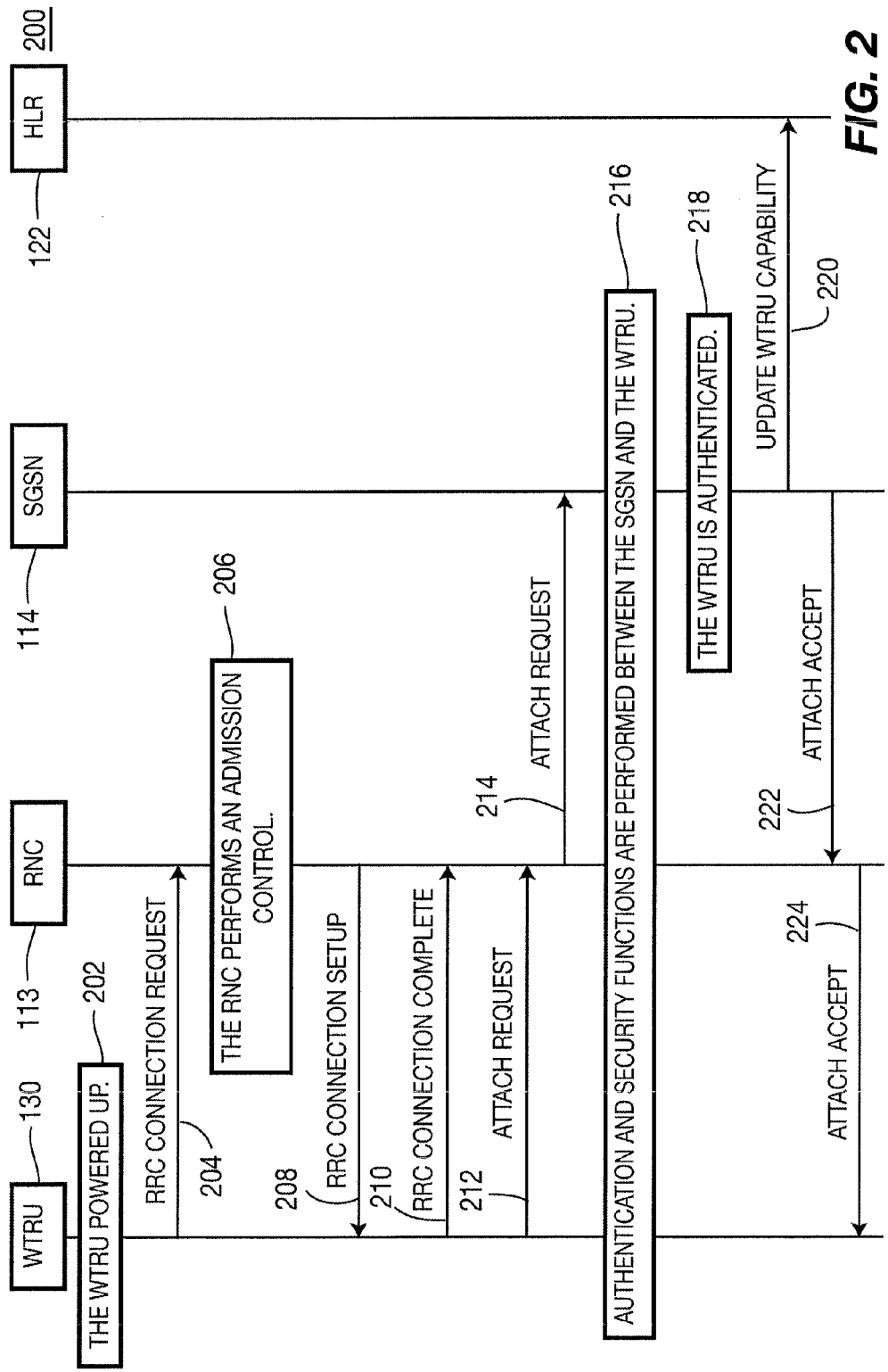

- MS NETWORK CAPABILITY VALUE: =
    <GEA 1 BITS>
    <SM CAPABILITIES VIA DEDICATED CHANNELS: BIT>
    <SM CAPABILITIES VIA GPRS CHANNELS: BIT>
    <UCS2 SUPPORT: BIT>
    <SS SCREENING INDICATOR: BIT STRING(2)>
    <SoLSA CAPABILITY: BIT>
    <REVISION LEVEL INDICATOR: BIT>
    <PFC FEATURE MODE: BIT>
    <EXTENDED GEA BITS>
    <LCS VA CAPABILITY: BIT>
    <SPARE BITS>;
    .
    .
    .

*FIG. 3A*
PRIOR ART

- MS NETWORK CAPABILITY VALUE: =
    <GEA 1 BITS>
    <SM CAPABILITIES VIA DEDICATED CHANNELS: BIT>
    <SM CAPABILITIES VIA GPRS CHANNELS: BIT>
    <SM CAPABILITIES VIA IMS: BITS, SMS (TEXT ONLY, TEXT & ANIMATION), IMS, MMS, ETC. > — 302
    <UCS2 SUPPORT: BIT>
    <SS SCREENING INDICATOR: BIT STRING(2)>
    <SoLSA CAPABILITY: BIT>
    <REVISION LEVEL INDICATOR: BIT>
    <PFC FEATURE MODE: BIT>
    <EXTENDED GEA BITS>
    <LCS VA CAPABILITY: BIT>
    <SPARE BITS>;

*FIG. 3B*

METHOD AND SYSTEM FOR REPORTING A SHORT MESSAGE CAPABILITY VIA AN IP MULTIMEDIA SUBSYSTEM

CROSS REFERENCE TO RELATED APPLICATIONS

This application is a continuation of U.S. patent application Ser. No. 14/584,229 filed Dec. 29, 2014, which is a continuation of U.S. patent application Ser. No. 13/338,512 filed Dec. 28, 2011, now U.S. Pat. No. 8,923,901, issued Dec. 30, 2014, which is a continuation of U.S. patent application Ser. No. 11/444,844, filed May 31, 2006, now U.S. Pat. No. 8,090,392, issued Jan. 3, 2012 which claims the benefit of U.S. provisional application No. 60/705,911 filed Aug. 5, 2005, which are incorporated by reference as if fully set forth.

FIELD OF INVENTION

The present invention is related to wireless communication systems. More particularly, the present invention is related to a method and system for reporting short message (SM) capability via an IP multimedia subsystem (IMS).

BACKGROUND

At initiation of a wireless communication session between a wireless transmit/receive unit (WTRU) and a core network, the WTRU requests for a signaling connection in an attach procedure according to third generation partnership project (3GPP) standards. Currently, a network capability to support a short message service (SMS) via dedicated channels and global packet radio service (GPRS) channels are reported in a network capability information element (IE).

However, there is no means for reporting WTRU SM capability via an IMS. As a consequence, the core network is unaware of the WTRU SM capability and an SM may not be routed to the WTRU via an IMS. Since the current wireless communication standards mandate that the WTRU indicate the preferred mode of operation (in terms of delivery of SMS), the WTRU should indicate the delivery of SMS over a GSM network or a GPRS based network. However, for example, if the WTRU is operating on a GPRS network and the preferred setting is on a GSM network, SMS messages may be lost. The same problem also occurs when the WTRU operates in a GSM mode while the preferred operation is GPRS delivery. Therefore, it is desirable to provide a means for the WTRU to report the SM capability over the IMS to the core network.

SUMMARY

The present invention is related to a method and system for reporting an SM capability over an IMS using a session initiation protocol (SIP). A WTRU registers with a core network and sends a message indicating its SM capability via the IMS to the core network. The core network then updates the WTRU capabilities based on the message and routes an SM to the WTRU via the IMS.

BRIEF DESCRIPTION OF THE DRAWINGS

FIG. 2 is a flow diagram of a process for reporting the SM capability of the WTRU during an attach procedure in accordance with the present invention.

FIG. 3A shows a conventional network capability information element (IE).

FIG. 3B shows a network capability IE configured in accordance with the present invention.

DETAILED DESCRIPTION OF THE PREFERRED EMBODIMENTS

Figure 1:
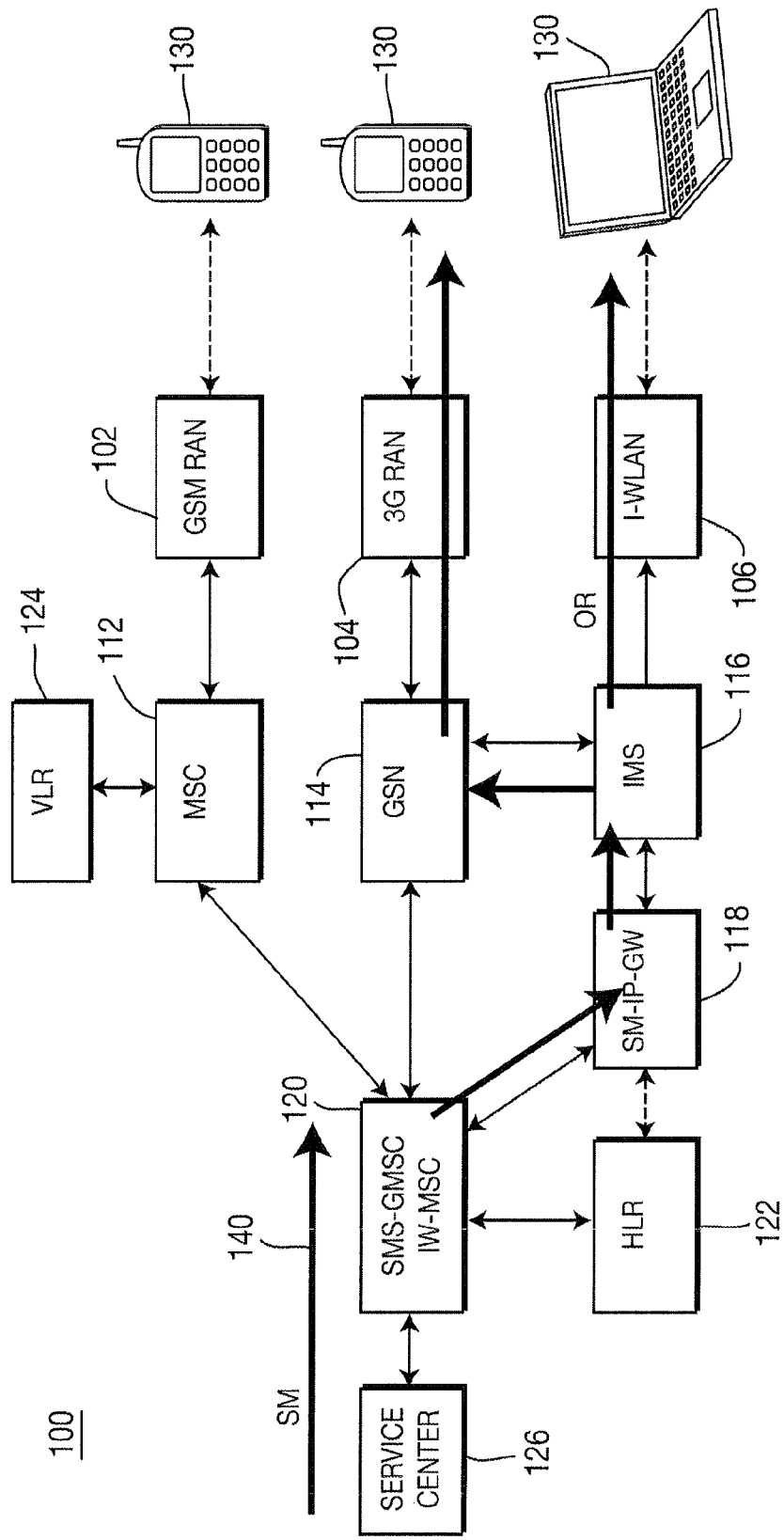
FIG. 1 is a block diagram of a wireless communication system that supports messaging services via an IMS in accordance with the present invention.

When referred to hereafter, the terminology "WTRU" includes but is not limited to a user equipment (UE), a mobile station, a fixed or mobile subscriber unit, a pager, or any other type of device capable of operating in a wireless environment.

The features of the present invention may be incorporated into an integrated circuit (IC) or be configured in a circuit comprising a multitude of interconnecting components.

FIG. 1 shows a block diagram of a wireless communication system 100 that supports messaging services over an IMS 116 using an SIP in accordance with the present invention. The system 100 includes a core network and one or more radio access networks (RANs) which may implement different radio access technologies (RATs). The RANs include, but are not limited to, a global standards for mobile communication (GSM) RAN 102, a third generation (3G) RAN 104 and an interworking wireless local area network (I-WLAN) 106. The core network includes a short message service (SMS) gateway mobile switching center (SMS-GMSC)/interworking mobile switching center (IW-MSC) 120, a home location register (HLR) 122, a short message IP gateway (SM-IP-GW) 118, a GPRS support node (GSN) 114, a mobile switching center (MSC) 112, an IMS 116, and a visitor location register (VLR) 124.

The GSM RAN 102 is connected to the MSC 112 for circuit switching services and the 3G RAN 104 is connected to the GSN 114 for packet switching services. The I-WLAN 106 has an IP access capability to the IMS 116, (via a packet data gateway (PDG) and/or a WLAN access gateway (WAG)), for IP services through the core network.

A service center 126 sends a short message (SM) 140 to the SMS-GMSC/IW-MSC 120. The SMS-GMSC/IW-MSC 120 is a gateway between the service center 126 and the MSC 112, the GSN 114 and/or the SM-IP-GW 118. The SMS-GMSC/IW-MSC 120 accepts a WTRU-terminated SM or a WTRU-originated SM and delivers the SM 140 to the MSC 112, the GSN 114 or the SM-IP-GW 118. When the WTRU 130 is connected to the 3G RAN 104, the SM 140 may be routed from the SMS-GMSC/IW-MSC 120 to the 3G RAN 104 via the GSN 114. When the WTRU 130 is connected to the GSM RAN 102, the SM 140 may be routed from the SMS-GMSC/IW-MSC 120 to the GSM RAN 102 via the MSC 112. When the WTRU 130 is registered with the SM-IP-GW 118, the SM 140 may be routed via the SM-IP-GW 118 and the IMS 116 using an SIP, which will be explained in detail hereinafter.

The SM 140 may be an SMS message, (e.g., text only or text plus video message), a multimedia message service (MMS) message, an instant message service message, or the like.

Before originating or receiving the SM 140 over an IP network, such as the IMS 116, the WTRU 130 must register with an appropriate SM-IP-GW 118. The SM-IP-GW 118 communicates between the WTRU 130 and the SMS-GMSC/IW-MSC 120, and provides protocol interworking for delivery of the SM 140 between the WTRU 130 and the SMS-GMAC/IW-MSC 120. The SM-IP-GW 118 maintains a registration status of WTRUs 130. Upon registration, the SM-IP-GW 118 informs the HLR 122 that the WTRU 130 has successfully registered with the SM-IP-GW 118.

Upon receipt of the SM 140 from the service center 126, the SMS-GMSC/IW-MSC 120 interrogates the HLR 122 to retrieve routing information for the WTRU 130. When the WTRU 130 is connected to the GSM RAN 102 or the 3G RAN 104, the HLR 122 returns the address of the MSC 112 or the GSN 114, respectively. If the WTRU 130 is registered with the SM-IP-GW 118, the HLR 122 returns the address of the SM-IP-GW 118.

In accordance with the present invention, the SM 140 is routed to the WTRU 130 over the IMS 116 using an SIP. The WTRU 130 is registered with the SM-IP-GW 118 and the registration status is recorded in the HLR 122. When the SMS-GMSC/IW-MSC 120 interrogates the HLR 122 for routing information, the HLR 122 returns the address of SM-IP-GW 118, (rather than the address of an appropriate MSC 112 or SGSN 114), to the SMS-GMSC/IW-MSC 120. The SMS-GMSC/IW-MSC 120 then delivers the SM 140 to the SM-IP-GW 118 using the obtained address of the SM-IP-GW 118. The SM-IP-GW 118 then forwards the SM 140 to the IMS 116.

The IMS 116 then forwards the SM 140 either to the 3G RAN 104 via the GSN 114 or to the I-WLAN 106, depending on the current connection of the WTRU 130. When the WTRU 130 is connected to the 3G RAN 104, the SM 140 is routed from the SM-IP-GW 118 to the 3G RAN 104 via the IMS 116 and the GSN 114 using an SIP. When the WTRU 130 is connected to the I-WLAN 106, the SM 140 is routed from the SM-IP-GW 118 to the I-WLAN 106 via the IMS 116 using an SIP.

In accordance with the present invention, the WTRU 130 reports its SM capability via an IMS using an SIP to the core network, (preferably a serving GPRS support node (SGSN)), to be recorded in the HLR 122. The reporting is preferably performed during an attach procedure, which will be described in detail hereinafter. The core network may also inform the WTRU 130 of the network's capability to support the SMS over an IMS.

FIG. 2 is a flow diagram of a process 200 for reporting WTRU SM capabilities via an IMS in accordance with the present invention. The WTRU 130 may be a multi-mode WTRU including multiple radio units for supporting multiple RATs, such as a GSM air interface, an I-WLAN air interface, a 3G air interface, or the like. Upon power up at step 202, the WTRU 130 sends a radio resource control (RRC) connection request message to a radio network controller (RNC) 113 of a 3G RAN to establish a connection to the 3G RAN 104 (step 204). The RNC 113 performs an admission control based on predetermined factors, such as availability of resources, or the like (step 206). If the RNC 113 decides to admit the WTRU 130, the RNC 113 sends an RRC connection setup message to the WTRU 130 (step 208). The WTRU 130 then sends an RRC connection complete message to the RNC 113 (step 210).

The WTRU 130 then sends an attach request message to the RNC 113 in order to receive 3G services (step 212). In accordance with the present invention, the information regarding the SM capability of the WTRU via an IMS is sent using a network capability IE along with the attach request message. The RNC 113 selects an SGSN 114 to serve the WTRU 130 and forwards the attach request message to the selected SGSN 114 along with the SM capability information (step 214). Authentication and security functions are performed between the WTRU 130 and the SGSN 114 (step 216). Once the WTRU 130 is authenticated at step 218, the SGSN 114 sends an update WTRU capability message to an HLR 122 to update WTRU capabilities (step 220) and sends an attach accept message to the RNC 113, which forwards it to the WTRU 130 (steps 222, 224). Once the WTRU capability is updated at the HLR 122 and the WTRU 130 is registered with the SM-IP-GW 118, the SM 140 may be routed to the WTRU 130 via the IMS 116. The core network, (preferably an SGSN), may also send information regarding the network's capability of supporting SMS data delivery over an IMS. The information may be sent along with the attach accept message or any other message.

FIG. 3A shows a conventional network capability IE. The network capability IE includes information bits indicating an SM capability via dedicated channels and an SM capability via GPRS channels, but not an SM capability via an IMS.

FIG. 3B shows an example of a network capability IE configured in accordance with the present invention. The network capability IE shown in FIG. 3B includes new information bits 302 indicating the SM capability via an IMS. The new information bits for the SM capability via an IMS may indicate capability of supporting SMS, IMS, MMS, or the like. A similar network capability IE may be used for the core network to report the network's capability to support SMS via an IMS.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method performed by a short message Internet Protocol gateway (SM-IP-GW), the method comprising:
   receiving a registration request, at the SM-IP-GW from a wireless transmit/receive unit (WTRU) via session initiation protocol (SIP), wherein the registration request indicates a capability of the WTRU to receive Short Message Service (SMS) messages via an Internet Protocol multimedia subsystem (IMS);
   transmitting a successful registration message, from the SM-IP-GW to a home location register (HLR), wherein the successful registration message indicates that the WTRU has successfully registered with the SM-IP-GW; and
   receiving a message comprising SMS data, at the SM-IP-GW from the WTRU, via the IMS using SIP.

2. The method of claim 1, wherein the message comprising SMS data is a multimedia message service (MMS) message.

3. The method of claim 1, wherein the message comprising SMS data is an instant message service message.

4. The method of claim 1, wherein the registration request is received over an interworking wireless local area network (I-WLAN).

5. A method performed by a short message Internet Protocol gateway (SM-IP-GW), the method comprising:
   receiving a registration request, at the SM-IP-GW from a wireless transmit/receive unit (WTRU) via session initiation protocol (SIP), wherein the registration request indicates a capability of the WTRU to receive Short Message Service (SMS) messages via an Internet Protocol multimedia subsystem (IMS);
   transmitting a successful registration message, from the SM-IP-GW to a home location register (HLR), wherein the successful registration message indicates that the WTRU has successfully registered with the SM-IP-GW; and transmitting a message comprising SMS data, from the SM-IP-GW to the WTRU, via the IMS using SIP.

6. The method of claim 5, wherein the message comprising SMS data is a multimedia message service (MMS) message.

7. The method of claim 5, wherein the message comprising SMS data is an instant message service message.

8. The method of claim 5, wherein the registration request is received over an interworking wireless local area network (I-WLAN).

9. A short message Internet Protocol gateway (SM-IP-GW) comprising:

a receiver configured to receive a registration request, at the SM-IP-GW from a wireless transmit/receive unit (WTRU) via session initiation protocol (SIP), wherein the registration request indicates a capability of the WTRU to receive Short Message Service (SMS) messages via an Internet Protocol multimedia subsystem (IMS); and a transmitter configured to transmit a successful registration message, from the SM-IP-GW to a home location register (HLR), wherein the successful registration message indicates that the WTRU has successfully registered with the SM-IP-GW;

wherein the transmitter is further configured to transmit a message comprising SMS data, from the SM-IP-GW to the WTRU, via the IMS using SIP.

10. The SM-IP-GW of claim 9, wherein the message comprising SMS data is a multimedia message service (MMS) message.

11. The SM-IP-GW of claim 9, wherein the message comprising SMS data is an instant message service message.

12. The SM-IP-GW of claim 9, wherein the registration request is received over an interworking wireless local area network (I-WLAN).

13. The SM-IP-GW of claim 9, wherein the receiver is further configured to receive a message comprising SMS data, at the SM-IP-GW from the WTRU, via the IMS using SIP.

* * * * *